US008626161B2

(12) United States Patent
Giaretta et al.

(10) Patent No.: US 8,626,161 B2
(45) Date of Patent: Jan. 7, 2014

(54) IDLE MODE MOBILITY MANAGEMENT IN A MULTI-ACCESS SYSTEM USING PMIP

(75) Inventors: Gerardo Giaretta, San Diego, CA (US); Kalle I. Ahmavaara, San Diego, CA (US); Lorenzo Casaccia, Rome (IT); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 782 days.

(21) Appl. No.: 12/192,838

(22) Filed: Aug. 15, 2008

(65) Prior Publication Data

US 2009/0047952 A1 Feb. 19, 2009

Related U.S. Application Data

(60) Provisional application No. 60/965,033, filed on Aug. 16, 2007.

(51) Int. Cl.
*H04W 4/00* (2009.01)

(52) U.S. Cl.
USPC ............... 455/435.1; 455/432.1; 455/346; 370/328; 370/331; 370/338

(58) Field of Classification Search
USPC ........ 455/435.1, 432.1, 435.2, 433, 436–444; 370/338, 331, 335, 342, 328
See application file for complete search history.

(56) References Cited

U.S. PATENT DOCUMENTS

| | | | |
|---|---|---|---|
| 6,567,664 B1 * | 5/2003 | Bergenwall et al. | ....... 455/435.1 |
| 6,819,659 B1 | 11/2004 | Palat et al. | |
| 7,042,864 B1 * | 5/2006 | Leung et al. | .................. 370/338 |
| 7,069,000 B1 | 6/2006 | Corson et al. | |
| 7,272,379 B1 * | 9/2007 | Tang et al. | .................... 455/406 |
| 7,324,492 B2 * | 1/2008 | Leung et al. | .................. 370/338 |
| 7,505,432 B2 | 3/2009 | Leung et al. | |

(Continued)

FOREIGN PATENT DOCUMENTS

| | | |
|---|---|---|
| CN | 1285703 A | 2/2001 |
| CN | 1774906 A | 5/2006 |

(Continued)

OTHER PUBLICATIONS

Gundavelli K Leung Cisco Systems V Devarapalli Azaire Networks S: "Proxy Mobile IPv6; draft-sgundave-mi p6-proxymi p6-00.txt" IETF Standard-Working-Draft, Internet Engineering Task Force, IETF, CH, Oct. 16, 2006, XP015048517 ISSN: 0000-0004 the whole document.

(Continued)

*Primary Examiner* — San Htun
*Assistant Examiner* — Magdi Elhag
(74) *Attorney, Agent, or Firm* — Jeffrey D. Jacobs

(57) ABSTRACT

Systems and methodologies are described that facilitate enabling multiple address access between two or more networks. A home agent can update a binding cache with a particular proxy binding update (PBU) to include two or more network gateway IP addresses associated with a user equipment (UE) within two or more networks or systems. When the UE in idle mode moves between networks or systems to which registration has occurred, an attachment procedure is not performed since the home agent includes the network gateway IP addresses related to such UE. Thus, inter-system idle mode mobility is enabled without having to perform a full attachment, re-registration, or de-registration based on the network location of the UE.

84 Claims, 9 Drawing Sheets

(56) References Cited

U.S. PATENT DOCUMENTS

| | | |
|---|---|---|
| 7,646,753 B2 * | 1/2010 | Islam et al. .................... 370/338 |
| 7,680,123 B2 * | 3/2010 | Veerepalli .................. 370/395.3 |
| 7,835,324 B2 * | 11/2010 | Chowdhury et al. ......... 370/331 |
| 7,929,506 B1 * | 4/2011 | Manning et al. .............. 370/338 |
| 2004/0213260 A1 | 10/2004 | Leung et al. |
| 2005/0088994 A1 | 4/2005 | Maenpaa et al. |
| 2005/0198337 A1 | 9/2005 | Sun et al. |
| 2006/0018291 A1 | 1/2006 | Patel et al. |
| 2006/0126582 A1 * | 6/2006 | Saifullah et al. .............. 370/338 |
| 2007/0105567 A1 * | 5/2007 | Mohanty et al. ............. 455/458 |
| 2008/0084842 A1 * | 4/2008 | Xiang et al. ................. 370/329 |
| 2008/0304434 A1 * | 12/2008 | Giaretta et al. ............... 370/313 |
| 2009/0052396 A1 * | 2/2009 | Bucker et al. ................ 370/331 |
| 2009/0296615 A1 * | 12/2009 | Kim et al. .................... 370/311 |

FOREIGN PATENT DOCUMENTS

| | | |
|---|---|---|
| EP | 1079656 A1 * | 2/2001 |
| JP | 2000316179 A | 11/2000 |
| JP | 2002538744 A | 11/2002 |
| WO | WO03096588 | 11/2003 |
| WO | 2007031389 A1 | 3/2007 |

OTHER PUBLICATIONS

International Search Report & Written Opinion—PCT/US2008/073407, International Search Authority—European Patent Office—Mar. 31, 2009.

Invitation to Pay Additional Fees—PCT/US2008/073407, International Search Authority—European Patent Office—Dec. 18, 2008.

* cited by examiner

IDLE MODE MOBILITY MANAGEMENT IN A MULTI-ACCESS SYSTEM USING PMIP

CROSS-REFERENCE TO RELATED APPLICATIONS

This application claims the benefit of U.S. Provisional Patent application Ser. No. 60/965,033 entitled "IDLE MODE MOBILITY MANAGEMENT IN A MULTI-ACCESS SYSTEM USING PMIP" which was filed Nov. 16, 2007. The entirety of the aforementioned application is herein incorporated by reference.

BACKGROUND

I. Field

The following description relates generally to wireless communications, and more particularly to idle mode management within multi-access systems and/or networks.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Area tracking within a wireless communication system enables a tracking area location for user equipment (e.g., mobile device, mobile communication apparatus, cellular device, smartphone, etc.) to be defined. Typically, a network can request or page the user equipment (UE) in which the UE can respond with such tracking area location. This enables the tracking area location of the UE to be communicated and updated to the network.

Across multiple networks or systems (e.g., 3GPP, non-3GPP, CDMA2000, etc.), each network or system performs idle mode mobility in a system-specific manner. In turn, paging areas and downlink packet termination nodes are different and system-specific. Since each network or system includes particular techniques, a UE moving from one system or network to another typically performs a full attach procedure regardless if the UE has attached to the system or network before. For example, a UE moving in a first network can perform a full attach procedure. The UE can then move to a second network and perform a full attach procedure. Yet, if the UE moves back to the first network, the UE will perform a full re-attach procedure. Such conventional techniques are inefficient in terms of conserving UE batter life and/or signal overhead.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating attaching and registering user equipment to two or more networks, wherein each network utilizes a particular and separate idle mode mobility technique. The systems and methodologies enable user equipment (UE) to seamlessly travel or move between wireless networks while in an idle mode. In particular, the UE in idle mode can connect from a first network to a second network without re-registration or full-attachment procedure.

According to related aspects, a method that facilitates enabling multiple address access between two or more networks is described herein. The method can include attaching a user equipment (UE) to a first network with a proxy mobile Internet Protocol (PMIP) registration to a home agent related to the UE. Further, the method can include attaching the UE to a second network with a PMIP registration to the home agent while maintaining registration of the first network. Moreover, the method can comprise enabling the UE to move between the first network and the second network in an idle mode, wherein the idle mode is a mode in which no signaling is generated. The method can additionally include receiving a portion of data, the portion of data is at least one of a downlink data packet targeted for the UE or an uplink data packet from the UE. Furthermore, the method can include transmitting the portion of data to the UE within one of the first network or the second network, the network to which the UE resides is identified by at least one of an active mode indication received from the UE or a page response received from the UE.

Another aspect relates to a wireless communications apparatus. The wireless communications apparatus can include at least one processor configured to attach a user equipment (UE) to a first network with a proxy mobile Internet Protocol (PMIP) registration to a home agent related to the UE, attach the UE to a second network with a PMIP registration to the home agent while maintaining registration of the first network, receive a portion of data, the portion of data is at least one of a downlink data packet targeted for the UE or an uplink data packet from the UE, enable the UE to move between the first network and the second network while in an idle mode, wherein the idle mode is a mode in which no signaling is generated, and transmit the portion of data to the UE within one of the first network or the second network, the network to which the UE resides is identified by at least one of an active mode indication received from the UE or a page response received from the UE. Further, the wireless communications apparatus can include memory coupled to the at least one processor.

Yet another aspect relates to a wireless communications apparatus that enables multiple address access between two or more networks. The wireless communications apparatus can include means for attaching a user equipment (UE) to a first network with a proxy mobile Internet Protocol (PMIP) registration to a home agent related to the UE. Additionally, the wireless communications apparatus can comprise means for attaching the UE to a second network with a PMIP registration to the home agent while maintaining registration of the first network. Further, the wireless communications apparatus can comprise means for enabling the UE to move between the first network and the second network while in an idle mode, wherein the idle mode is a mode in which no signaling is generated. Moreover, the wireless communications apparatus can comprise means for receiving a portion of data, the portion of data is at least one of a downlink data packet targeted for the UE or an uplink data packet from the UE. Furthermore, the wireless communications apparatus can comprise means for transmitting the portion of data to the UE within one of the first network or the second network, wherein the network to which the UE resides is identified by at least one of an active mode indication received from the UE or a page response received from the UE.

Still another aspect relates to a computer program product comprising a computer-readable medium having stored thereon code for attaching a user equipment (UE) to a first network with a proxy mobile Internet Protocol (PMIP) registration to a home agent related to the UE, attaching the UE to a second network with a PMIP registration to the home agent while maintaining registration of the first network, receiving a portion of data, the portion of data is at least one of a downlink data packet targeted for the UE or an uplink data packet from the UE, enabling the UE to move between the first network and the second network while in an idle mode, wherein the idle mode is a mode in which no signaling is generated, and transmitting the portion of data to the UE within one of the first network or the second network, the network to which the UE resides is identified by at least one of an active mode indication received from the UE or a page response received from the UE.

According to other aspects, a method that facilitates idle mode mobility across two or more networks. The method can comprise receiving a first proxy mobile Internet Protocol (PMIP) request from a user equipment (UE) within a first network to attach to the first network. Further, the method can comprise registering the UE with a first network gateway IP address within a home agent based upon the first PMIP request. Moreover, the method can include receiving a second PMIP request from the UE within a second network to attach to the second network. Additionally, the method can comprise registering the UE with a second network gateway IP address within the home agent based upon the second PMIP request. Furthermore, the method can include utilizing at least one of the first network gateway IP address or the second network gateway IP address to allow the UE to execute an idle mode between the first network and the second network without performing at least one of a re-registration of the UE during such idle mode or a de-registration of the UE during such idle mode.

Another aspect relates to a wireless communications apparatus. The wireless communications apparatus can include at least one processor configured to receive a first proxy mobile Internet Protocol (PMIP) request from a user equipment (UE) within a first network to attach to the first network, register the UE with a first network gateway IP address within a home agent based upon the first PMIP request, receive a second PMIP request from the UE within a second network to attach to the second network, register the UE with a second network gateway IP address within the home agent based upon the second PMIP request, and utilize at least one of the first network gateway IP address or the second network gateway IP address to allow the UE to execute an idle mode between the first network and the second network without performing at least one of a re-registration of the UE during such idle mode or a de-registration of the UE during such idle mode. Further, the wireless communications apparatus can include memory coupled to the at least one processor.

Another aspect relates to a wireless communications apparatus that provides idle mode mobility across two or more networks. The wireless communications apparatus can comprise means for receiving a first proxy mobile Internet Protocol (PMIP) request from a user equipment (UE) within a first network to attach to the first network. Moreover, the wireless communications apparatus can comprise means for registering the UE with a first network gateway IP address within a home agent based upon the first PMIP request. Further, the wireless communications apparatus can include means for receiving a second PMIP request from the UE within a second network to attach to the second network. Additionally, the wireless communications apparatus can comprise means for registering the UE with a second network gateway IP address within the home agent based upon the second PMIP request. Furthermore, the wireless communications apparatus can comprise means for utilizing at least one of the first network gateway IP address or the second network gateway IP address to allow the UE to execute an idle mode between the first network and the second network without performing at least one of a re-registration of the UE during such idle mode or a de-registration of the UE during such idle mode.

Still another aspect relates to a computer program product comprising a computer-readable medium having stored thereon code for causing at least one computer to receive a first proxy mobile Internet Protocol (PMIP) request from a user equipment (UE) within a first network to attach to the first network, register the UE with a first network gateway IP address within a home agent based upon the first PMIP request, receive a second PMIP request from the UE within a second network to attach to the second network, register the UE with a second network gateway IP address within the home agent based upon the second PMIP request, and utilize at least one of the first network gateway IP address or the second network gateway IP address to allow the UE to execute an idle mode between the first network and the second network without performing at least one of a re-registration of the UE during such idle mode or a de-registration of the UE during such idle mode.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
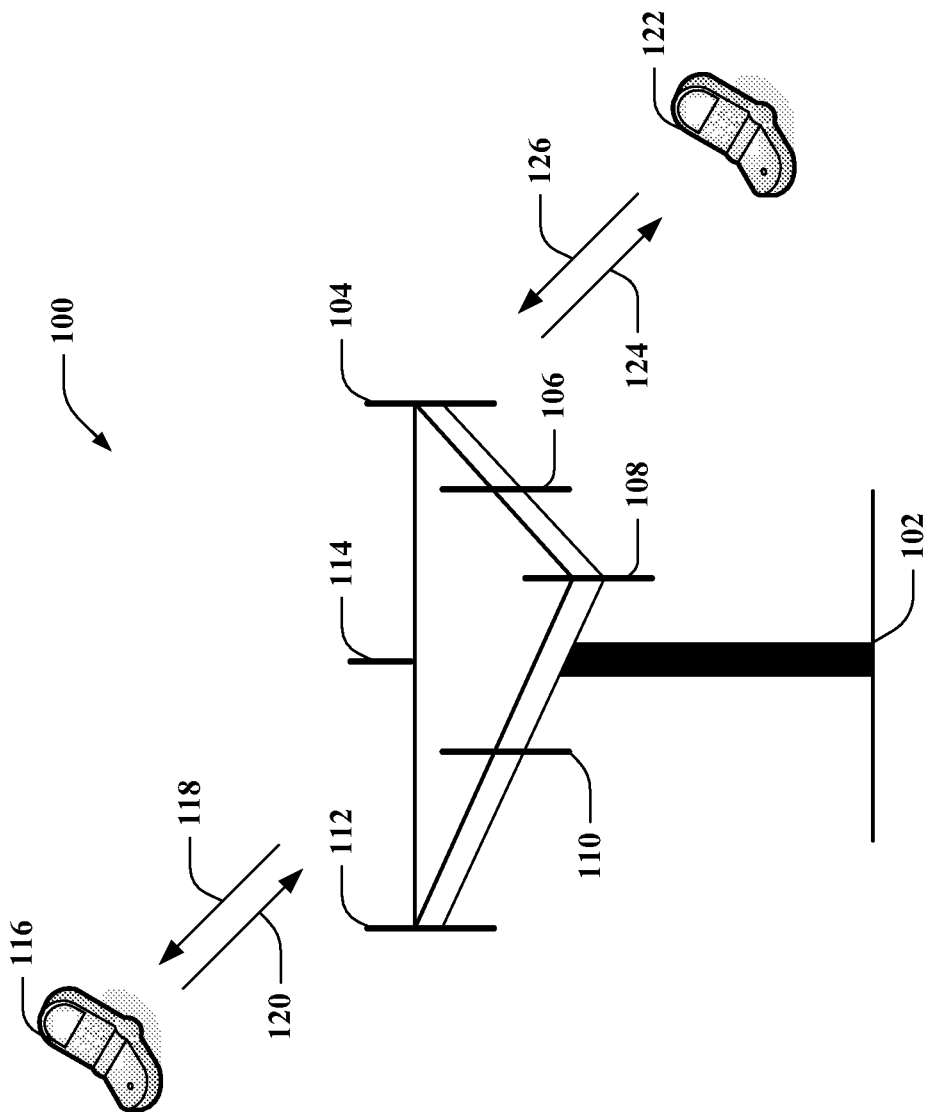
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "agent," "manager," "broadcaster," "gateway," "pager," "tracker," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting—Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can enable a user equipment (UE) to be idle (e.g., an idle mode, wherein an idle mode is a mode in which no signaling is generated) within a plurality of networks or access systems. For instance, a UE typically registers and/or performs a full-attach procedure with each network the UE is located within regardless of whether the UE has registered or attached to such network before. For instance, a UE traveling/moving from a first network to a second network and back to the first network would typically need to perform registration and full-attachment procedures for the first network, the second network, and the move back to the first network. The subject innovation can allow the UE to avoid full re-attach procedures. Thus, when the UE gets back to a system or network, the UE does not need to perform a re-attach procedure as the tracking system already has a state for such UE unless tracking area (TA) registration expired or the UE detects movement to a new TA.

In general, the UE is registered to a home agent with one home agent address using proxy mobile IP. This can avoid sending a proxy binding update (PBU) at any idle mode movement across systems or networks. When the home agent receives downlink data, the home agent can simultaneously broadcast the packets to the mobile access gateways (MAGs) (e.g., the systems or networks to which the UE has registered). Upon such broadcast, the gateway/MAG pages the UE. When the UE becomes active in a system, the respective MAG can de-register the MAG address of the systems or networks the UE is not located in order to terminate broadcasting. The de-registration can be done with a wild-card option1 as the gateway in the system to which the UE is located may not know the address of the gateway in the systems or networks the UE is not located. When the UE becomes idle again, the MAG can re-establish the state for the home agent within the adding or reinstatement of the previously de-registered MAG addresses (e.g., using a wild-card option2). In other words, the home agent does not remove the entry related to the systems or networks the UE is not located when receiving the wild-card option but just blocks the entry and makes it valid again when receiving the wild-card option2.

Figure 2:
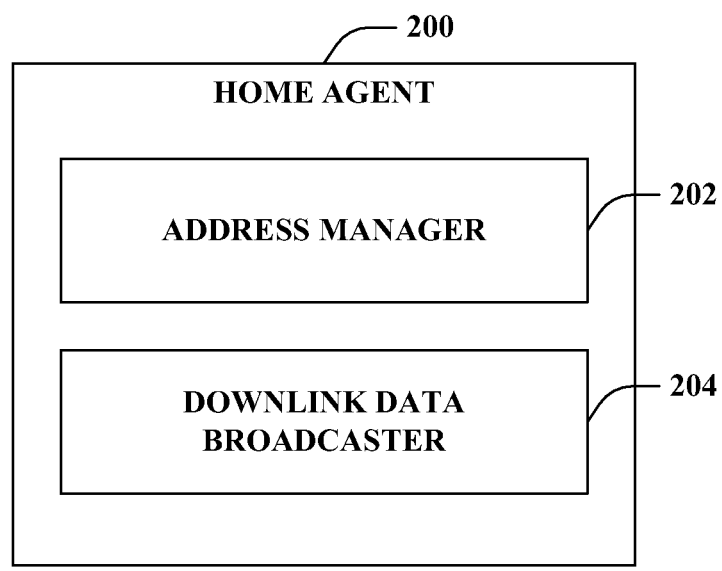
FIG. 2 is an illustration of an example home agent for employment within a wireless communications environment.

Turning to FIG. 2, illustrated is a home agent 200 for employment within a wireless communications environment. The system 200 can include a home agent 200 that can receive proxy mobile Internet protocol (PMIP) requests in order to attach and register a UE to a network or system. The home agent 200 can be a base station or a portion thereof, a mobile device or a portion thereof, or substantially any communications apparatus that receives data transmitted in a wireless communications environment. The home agent 200 can include an address manager 202 that tracks network gateway IP addresses for the networks or systems to which the UE is located or travels. For example, the home agent 200 can receive a PMIP request to attach a UE to a first network, wherein based upon such PMIP request, the address manager 202 can store a first network gateway IP address within a binding cache (not shown). It is to be appreciated that the address manager 202 can update the binding cache with any suitable number of network IP addresses based at least in part upon the location of a UE. In other words, when the UE moves or travels into a system or network, the address manager 202 can update, delete, block, or add a respective network gateway IP address into the binding cache. By registering the network gateway IP address within the binding cache within the home agent 200, the ULE can perform in an idle mode across such registered networks or systems without a full re-attach procedure.

For example, the home agent 200 can receive a first PMIP request from a UE which can initiate an attachment procedure for the UE to a first network. It is to be appreciated that the home agent 200 can receive any suitable number of PMIP requests in order to attach a UE to any suitable number of networks or systems. The address manager 202 can update the binding cache with a first network gateway IP address related to such PMIP request. The address manager 202 can update the binding cache with any suitable number of network gateway IP addresses. By updating the binding cache within the home agent 200 via the address manager 202 with each of the networks and/or systems, idle mode mobility across numerous systems or networks can be provided. In other words, the UE need not de-register or re-register with networks or systems while in idle mode. The subject innovation enables seamless transitions across various networks (e.g., 3GPP, non-3GPP, CDMA2000, universal mobile telecommunication system (UMTS), etc.) while a UE is in idle mode.

Upon receipt of a portion of downlink data, the home agent 200 can locate the ULE in idle mode regardless of which network or system such UE resides based at least in part upon the home agent 200 and/or address manager 202 storing network gateway IP addresses. The home agent 200 can further include a downlink data broadcaster 204 that can simultaneously broadcast data to the registered networks based upon attachment and registration with the home agent 200. Within the respective networks or systems, a paging and/or tracking technique can be employed (e.g., discussed in more detail in FIG. 3). In response to such paging and/or tracking technique, a PBU can be received by the home agent 200. It is to be appreciated that the downlink data broadcaster 204 can transmit a portion of data simultaneously to any suitable number of networks or systems that are registered and/or listed with the home agent 200. Additionally, upon the receipt of a portion of uplink data within a network, the home agent 200 can receive an active mode indication from the UE which can initiate the communication of a PBU.

In an example, the binding cache within the home agent 200 can be updated with a proxy binding update (PBU), wherein the PBU can include a PBU source address. In general, the PBU can include a specific flag/option that employs the removal of any address (e.g., wild-card delete PBU) in the binding cache except the source address of the PBU. Upon receipt of such PBU, the address manager 202 can store, add, block, delete, and/or update the binding cache accordingly. In other words, the source address can be reflective of the system or network to which the UE is located and identifies the network gateway IP address to which the home agent 200 can utilize to communicate data. Upon the UE returning to an idle mode, a specific flag/option can employ the addition of any address (e.g., wild-card add PBU) in the binding cache that was removed during the wild-card delete (see above). For instance, the wild-card delete PBU can block the network gateway IP addresses within the binding cache and then activate (e.g., unblock) the addresses upon receiving a wild-card add PBU.

Moreover, although not shown, it is to be appreciated that home agent 200 can include memory that retains instructions with respect to receiving a first proxy mobile Internet Protocol (PMIP) request from a user equipment (UE) within a first network to attach to the first network, registering the UE with a first network gateway IP address within a home agent based upon the first PMIP request, receiving a second PMIP request from the UE within a second network to attach to the second network, registering the UE with a second network gateway IP address within the home agent based upon the second PMIP request, and utilizing at least one of the first network gateway IP address or the second network gateway IP address to allow the UE to execute an idle mode between the first network and the second network without performing at least one of a re-registration of the UE during such idle mode or a de-registration of the UE during such idle mode.

Figure 3:
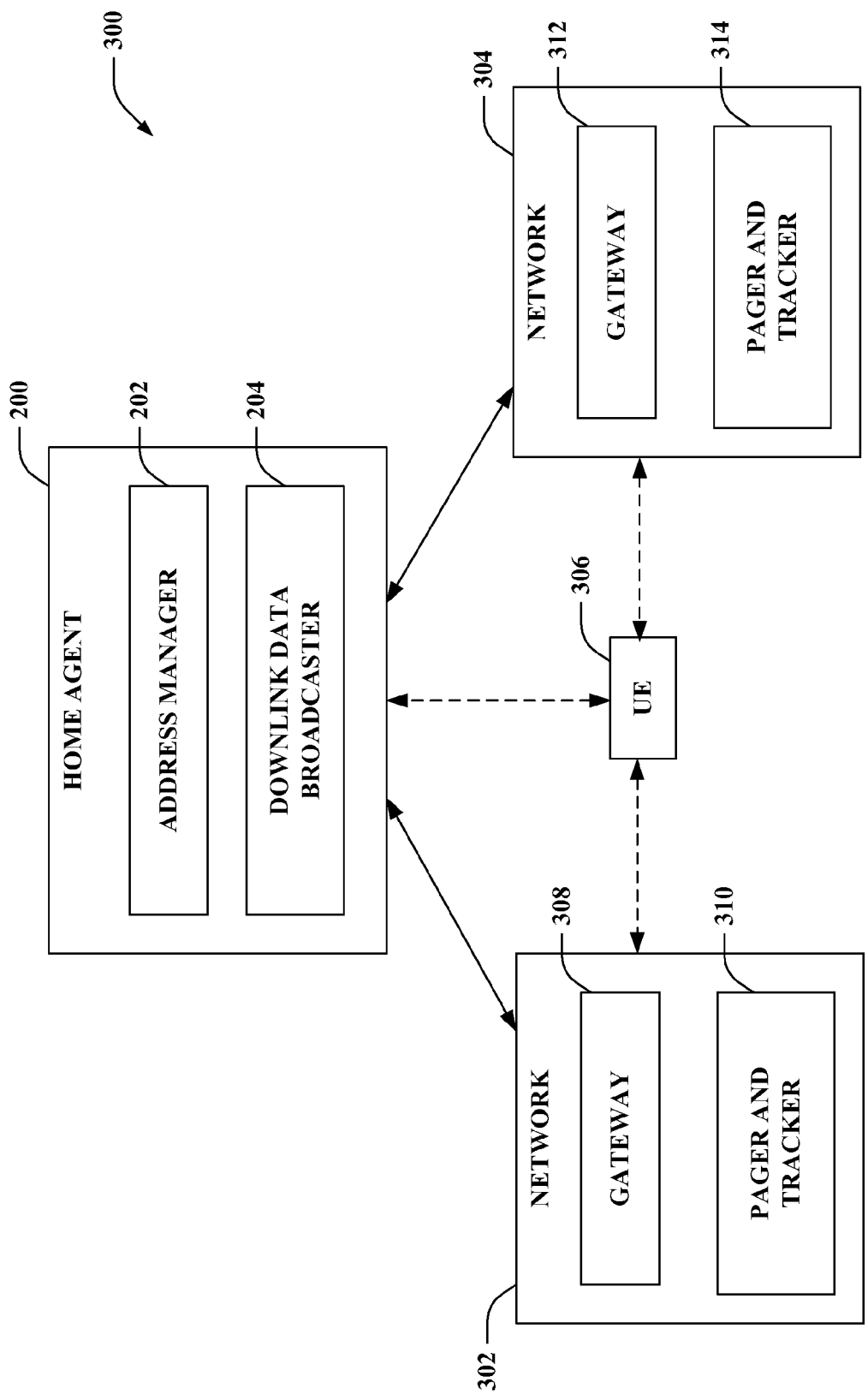
FIG. 3 is an illustration of an example wireless communications system that facilitates employing idle mode mobility for user equipment within two or more networks.

Now referring to FIG. 3, illustrated is a wireless communications system 300 that facilitates employing idle mode mobility for user equipment within two or more networks. The system 300 includes at least one network (e.g., a first network 302 and a second network 304, herein collectively referred to as 'network 302 and/or 304') that communicates with a user equipment (UE) 306 (and/or any number of disparate UEs (not shown)). The network 302 and/or 304 can transmit information to UE 306 over a forward link channel; further network 302 and/or 304 can receive information from UE 306 over a reverse link channel. Moreover, system 300 can be a MIMO system. Additionally, the system 300 can operate in an OFDMA wireless network, a 3GPP LTE wireless network, etc. Also, the components and functionalities shown and described below in the network 302 and/or 304 can be present in the UE 306 as well and vice versa, in one example; the configuration depicted excludes these components for ease of explanation. Moreover, it is to be appreciated that for the sake of brevity, the system 300 is described with a first network 302 and a second network 304, although it is to be appreciated that there can be any suitable number of networks.

The system 300 can further include the home agent 200, the address manger 202, and the downlink data broadcaster 204 which can be substantially similar to agents, managers, and broadcasters previously described. The system 300 can further include the first network 302 and the second network 304, wherein the UE 306 can communicate data there between. In particular, the home agent 200 can register and attach the ULE 306 to the first network and/or the second network 304 (see FIG. 2). In general, the home agent 200 can track network gateway IP addresses associated with the UE 306 in order to provide seamless idle mode mobility between two or more networks (e.g., the first network 302, the second network 304, etc.).

The UE 306 can attach to the first network 302 or the second network 304 with an attachment procedure in order to receive an IP address based at least in part upon the location of the UE 306 within particular tracking areas (TAs) or networks. As previously discussed, by registering the network gateway IP addresses within the home agent 200, the UE 306 can idle between the first network 302 and the second network 304 unless the tracking area registration has expired or the UE 306 detects that it has moved to an area where it receives a new "non-registered" tracking area. The first network 302 can include a gateway 308 and a pager and tracker 310. Similarly, the second network 304 can include a gateway 312 and a pager and tracker 314.

Regardless of which network the UE 306 resides, the system 300 can communicate a portion of data thereto. It is to be appreciated that the portion of data can be, but is not limited to being, a downlink data packet targeted for the UE 306 or an uplink data packet from the UE 306. Upon receipt of a downlink data packet targeted for the UE 306, the gateways registered with the home agent 200 (here, gateway 308 and gateway 312) can trigger a paging and/or tracking technique to the UE 306 (implemented here by the pager and tracker 310 within the first network 302 and the pager and tracker 314 in the second network 304). The UE 306 can communicate a page response from within the network it resides to the appropriate pager and tracker. Based on the page response from the UE 306 and/or the source of such page response, the location of which network the UE 306 resides can be determined. Thus, the gateway within such identified network can communicate a PBU to the home agent 200. This further enables the downlink data packet to be communicated to the UE 306. Upon receipt of uplink data packet from the UE 306, the gateway to which the UE 306 resides can communicate a PBU to the home agent 200, which can inform the location of such UE 306. Accordingly, the portion of data can be communicated between the UE 306 and the home agent 200 via one of the first network 302 or the second network 304. Furthermore, the UE 306 can return back to the idle mode upon the completion of the communication of data. For example, the UE 306 can transmit an idle mode indication to the network or gateway, which can trigger the network or gateway to communicate a PBU to the home agent.

Moreover, although not shown, it is to be appreciated that the networks 302 and/or 304 can include memory that retains instructions with respect to attaching a user equipment (UE) to a first network with a proxy mobile Internet Protocol (PMIP) registration to a home agent related to the UE, attaching the UE to a second network with a PMIP registration to the home agent without de-registration of the first network, enabling the UE to idle within the first network or the second network without performing an additional attachment, receiving a portion of data, the portion of data is at least one of a downlink data packet targeted for the UE or an uplink data packet from the UE, and transmitting the portion of data to the UE within one of the first network or the second network, the network to which the UE resides is identified by at least one of an active mode indication received from the UE or a page response received from the UE.

Figure 4:
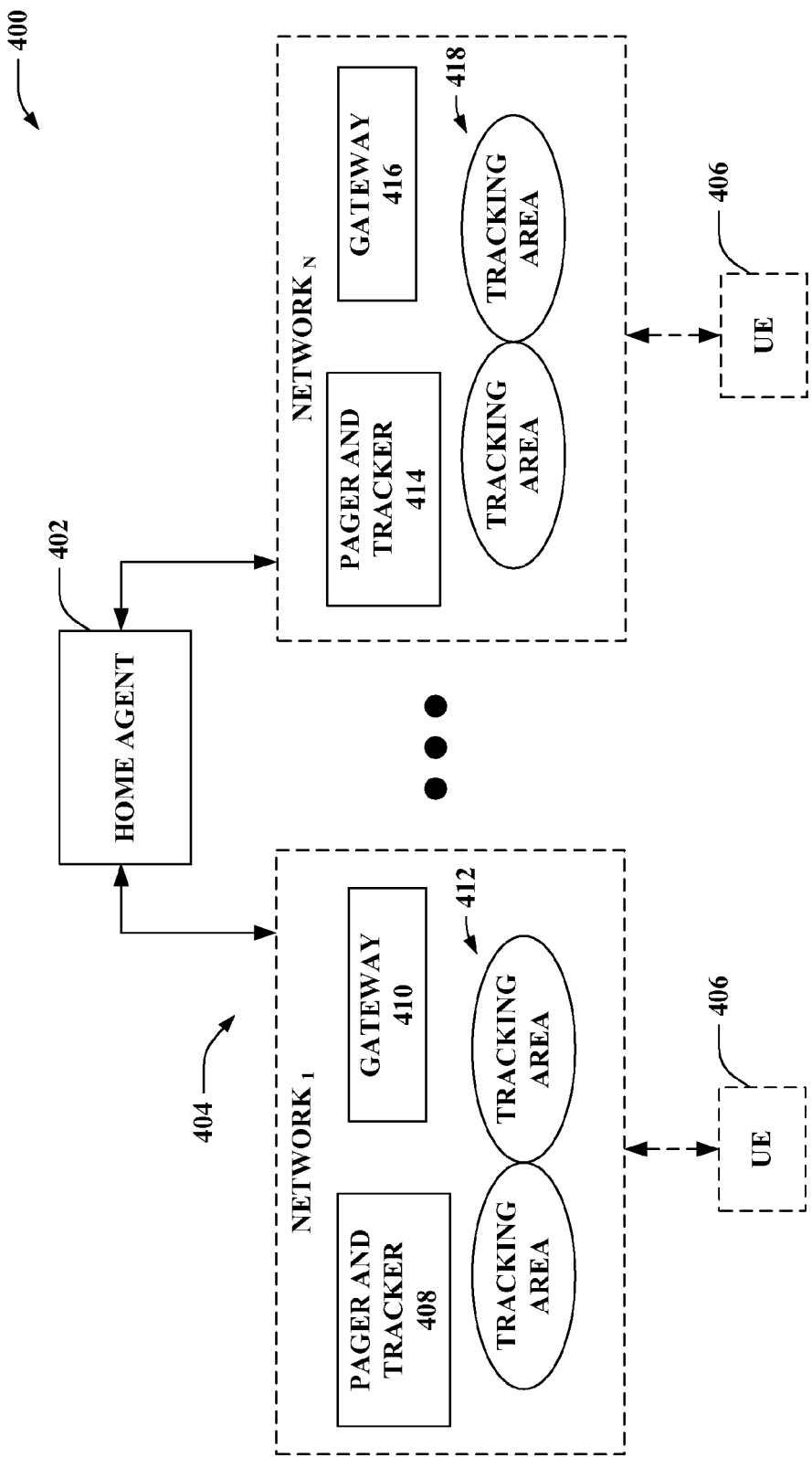
FIG. 4 is an illustration of an example wireless communications system that facilitates idling user equipment within a plurality of access systems and/or networks.

Now referring to FIG. 4, an example wireless communications system 400 that facilitates idling user equipment within a plurality of access systems and/or networks. The system 400 can include a home agent 402 that can store network gateway IP addresses for a UE 406 which enables idle mode mobility between two or more networks 404. It is to be appreciated that the UE 406 can reside on any suitable number of networks, such as network 1 to network N, where N is a positive integer. Furthermore, it is to be appreciated and understood that each network can include a specific idle mode mobility technique. A first network can include a pager and tracker 408, a gateway 410, and tracking areas 412. A second network can include a pager 414, a gateway 416, and tracking areas 418. The two or more networks 404 can include the first network and/or the second network.

During an initial attach in regards to a PMIP situation, the UE 406 can perform an attach procedure on the first network. The UE 406 can receive an IP address (IP UE). The gateway 410 can perform PMIP bootstrapping (e.g., home agent 402 selection) registration. The home agent 402 can have an IP_UE→GW_first network binding. The UE can be in idle mode, wherein the pager and tracker 408 knows the tracking area where the UE 406 is located (e.g., tracking area 1 within the first network). Mobility can be handled by the tracking system based on the first network specification. When the UE 406 moves to a disparate tracking area, the UE 406 can send a tracking area update updating the location in the tracking system). When a downlink packet arrives at the home agent 402, the home agent 402 can send the downlink packet to the GW_first network. The gateway 410 can trigger the paging procedure to be performed by the pager and tracker 408. The UE 406 can reply with a page response, wherein the data can be transferred.

During a movement to the second network, the UE 406 can attach to the second network for the first time with a full attach procedure. Based on a modified attach procedure for the second network, the UE 406 can be assigned the same IP_UE. The gateway 416 can register its address at the home agent 402. This registration is a multiple care of address (CoA) (e.g., the registration does not replace GW_first network). The home agent 402 has an IP_UE→(GW_first network, GW_second network). It is to be appreciated that the second network can take into account that the same IP address used in the first network can be allocated to the UE 406. Moreover, some modification can be done in the attach procedure of the first network and/or the second network in order to activate PMIP for inter-system mobility.

Movement in idle mode can be handled by the respective system or network without additional signaling. Additional signaling happens for a tracking area change but this is not specific of an inter system scenario. If the UE 406 goes back to the first network, signaling need not occur unless: the tracking area is expired or the UE 406 detects that it has moved to an area where a new "non-registered" tracking area of the first network is received. By employing the above, free signaling inter system idle mode mobility is provided.

During downlink data and paging, the home agent 402 does not know where the UE 406 is located. Thus, the home agent 402 bi-casts data packets to both the first network and the second network (e.g., gateway 410 and gateway 416). Each network can perform paging (e.g., the pager and tracker 408 in the first network and the pager and tracker 414 in the second network). The UE 406 can send a page response in the second network (e.g., the network to which the UE 406 resides). The gateway 416 (e.g., GW_second network) can send a PBU to the home agent 402 deleting (e.g., blocking) the GW_first network to stop bi-casting.

During uplink data, the UE 406 can select in which network it turns to active mode (e.g., here the UE is still in the second network). The gateway 416 can remove or block the GW_first network address at the home agent 402 by sending a PBU to the home agent 402. The UE 406 can start to communicate via the second network. It is to be appreciated that the first network does not need to now that the UE 406 is active in the second network and should maintain the UE 406 in idle mode.

When the UE 406 falls back into an idle mode, the gateway 416 (e.g., the gateway associated with the network in which the UE 406 resides) can re-establish the state at the home agent 402 (e.g., the gateway 416 can add the GW_first network address). The gateway 416 can send a PBU with the GW_first network address as CoA. This PBU can be a multiple registration (e.g., the PBU does not delete the GW_second network address).

Figure 5:
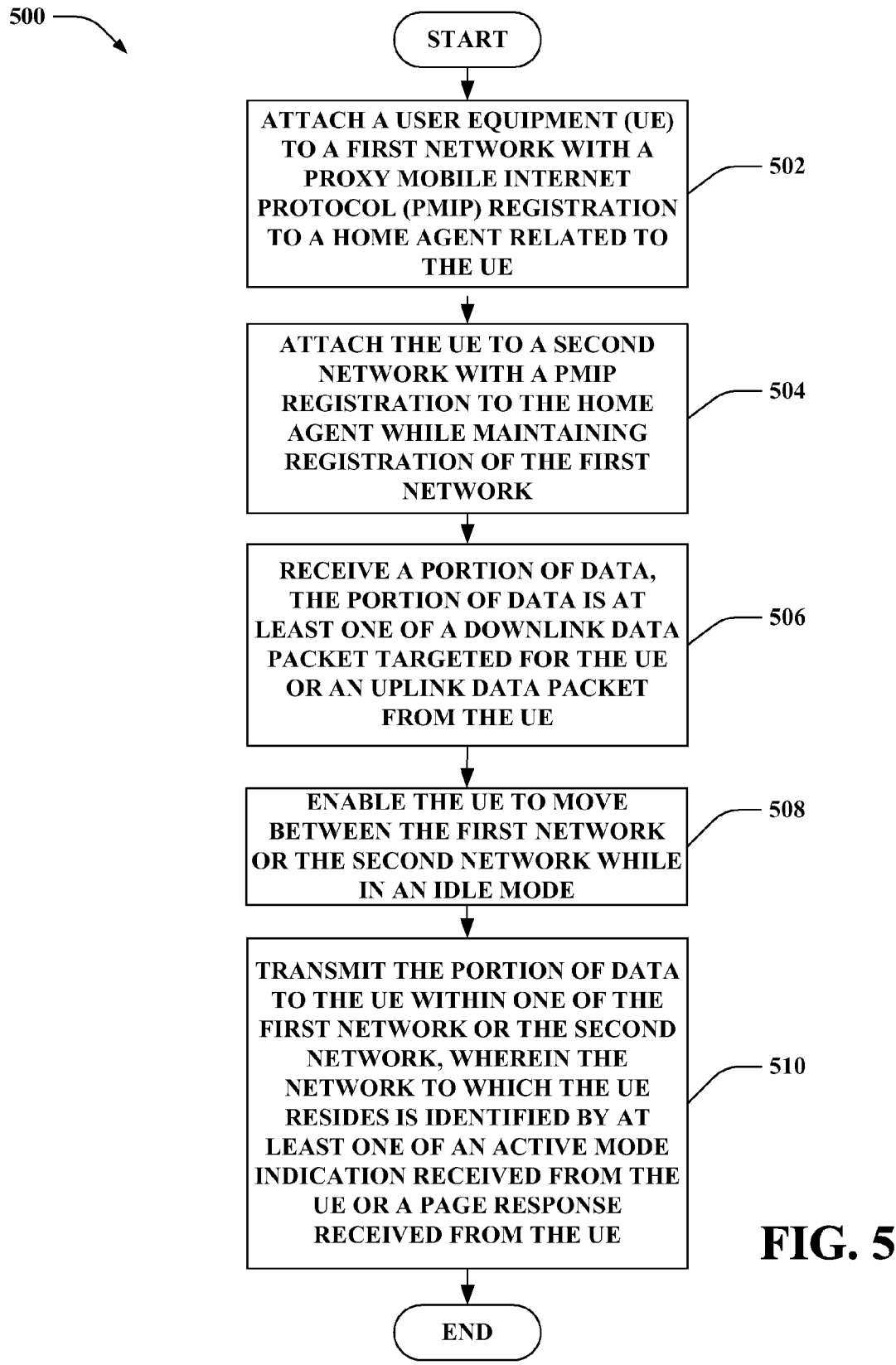
FIG. 5 is an illustration of an example methodology that facilitates attaching and registering user equipment to two or more networks, wherein each network utilizes a particular and separate idle mode mobility technique.
Figure 6:
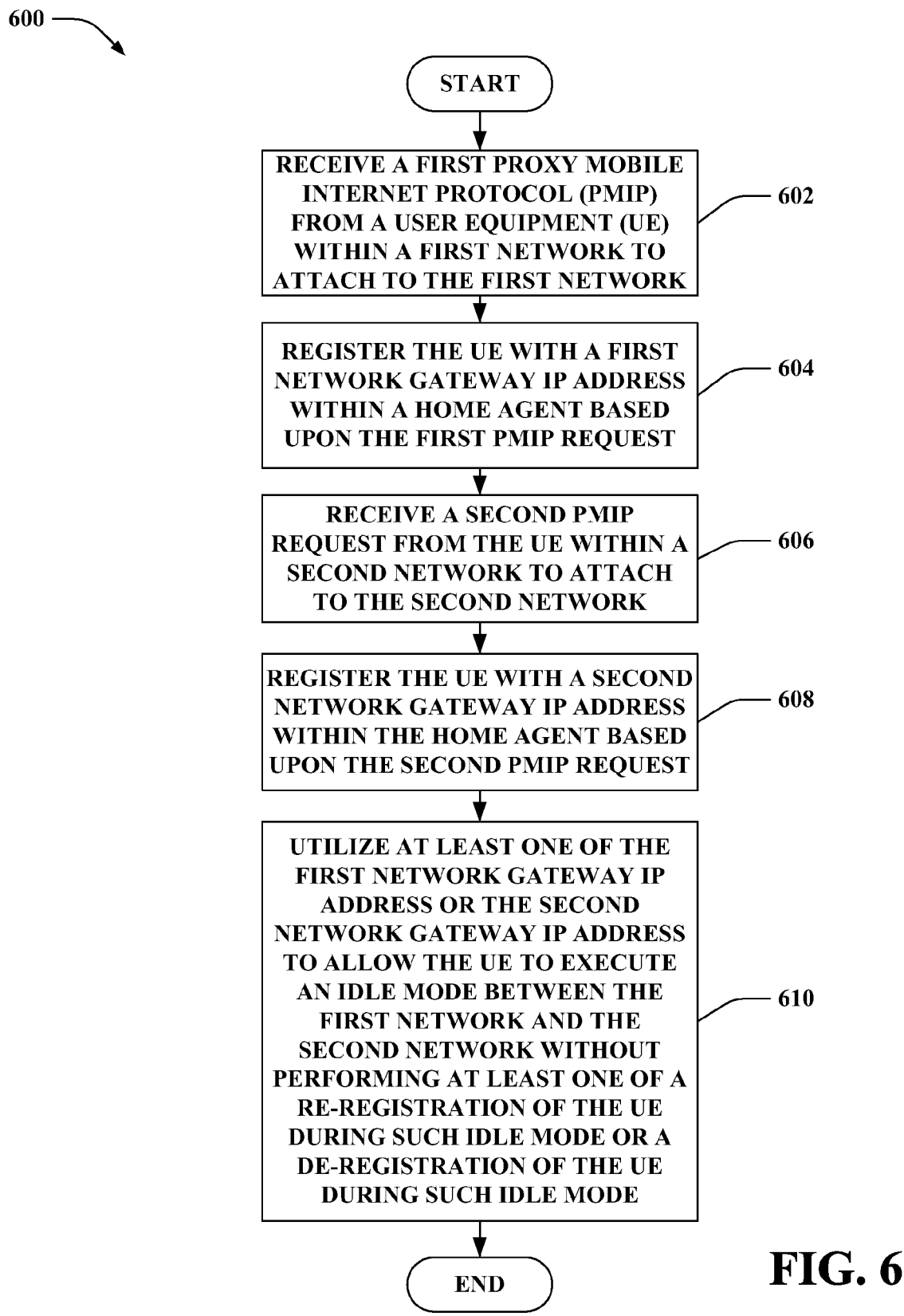
FIG. 6 is an illustration of an example methodology that facilitates registering user equipment with multiple addresses within a home agent to enable seamless and efficient idle mode mobility between multiple networks.

Referring to FIGS. 5-6, methodologies relating to providing uplink timing control while reducing overhead and power consumption are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates attaching and registering user equipment to two or more networks, wherein each network utilizes a particular and separate idle mode mobility technique. At reference numeral 502, a user equipment (UE) can be attached to a first network with a proxy mobile Internet Protocol (PMIP) registration to a home agent related to the UE. At reference numeral 504, the UE can be attached to a second network with a PMIP registration to the home agent while maintaining registration of the first network. At reference numeral 506, a portion of data can be received, wherein the portion of data is at least one of a downlink data packet targeted for the UE or an uplink data packet from the UE. At reference numeral 508, the UE can move between the first network and the second network while in an idle mode, wherein an idle mode is a mode in which no signaling is generated. At reference numeral 510, the portion of data can be transmitted to the UE within one of the first network or the second network, wherein the network to which the UE resides is identified by at least one of an active mode indication received from the UE or a page response received from the UE.

Now referring to FIG. 6, a methodology 600 that facilitates registering user equipment with multiple addresses within a home agent to enable seamless and efficient idle mode mobility between multiple networks. At reference numeral 602, a first proxy mobile Internet Protocol (PMIP) request can be received from a user equipment (UE) within a first network to attach to the first network. At reference numeral 604, the UE can be registered with a first network gateway IP address within a home agent based upon the first PMIP request. At reference numeral 606, a second PMIP request can be received from the UE within a second network to attach to the second network. At reference numeral 608, the UE can be registered with a second network gateway IP address within the home agent based upon the second PMIP request. At reference numeral 610, at least one of the first network gateway IP address or the second network gateway IP address can be utilized to allow the ULE to execute an idle mode between the first network and the second network without performing at least one of a re-registration of the UE during such idle mode or a de-registration of the UE during such idle mode.

Figure 7:
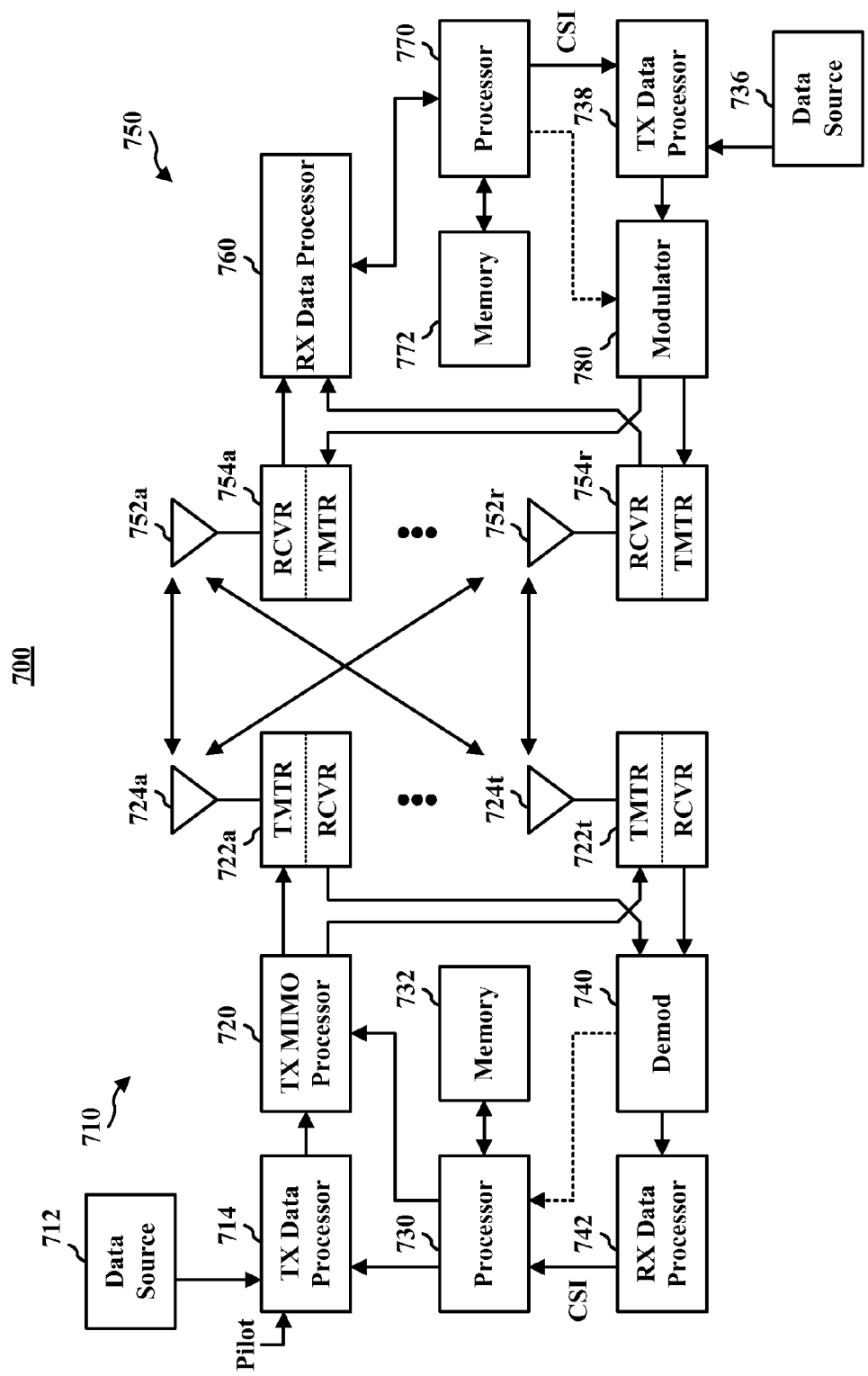
FIG. 7 is an illustration of an example wireless network environment that can be employed in conjunction with the various systems and methods described herein.

FIG. 7 shows an example wireless communication system 700. The wireless communication system 700 depicts one base station 710 and one mobile device 750 for sake of brevity. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1-4) and/or methods (FIGS. 5-6) described herein to facilitate wireless communication there between.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

A processor 770 can periodically determine which precoding matrix to utilize as discussed above. Further, processor 770 can formulate a reverse link message comprising a matrix index portion and a rank value portion.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 8:
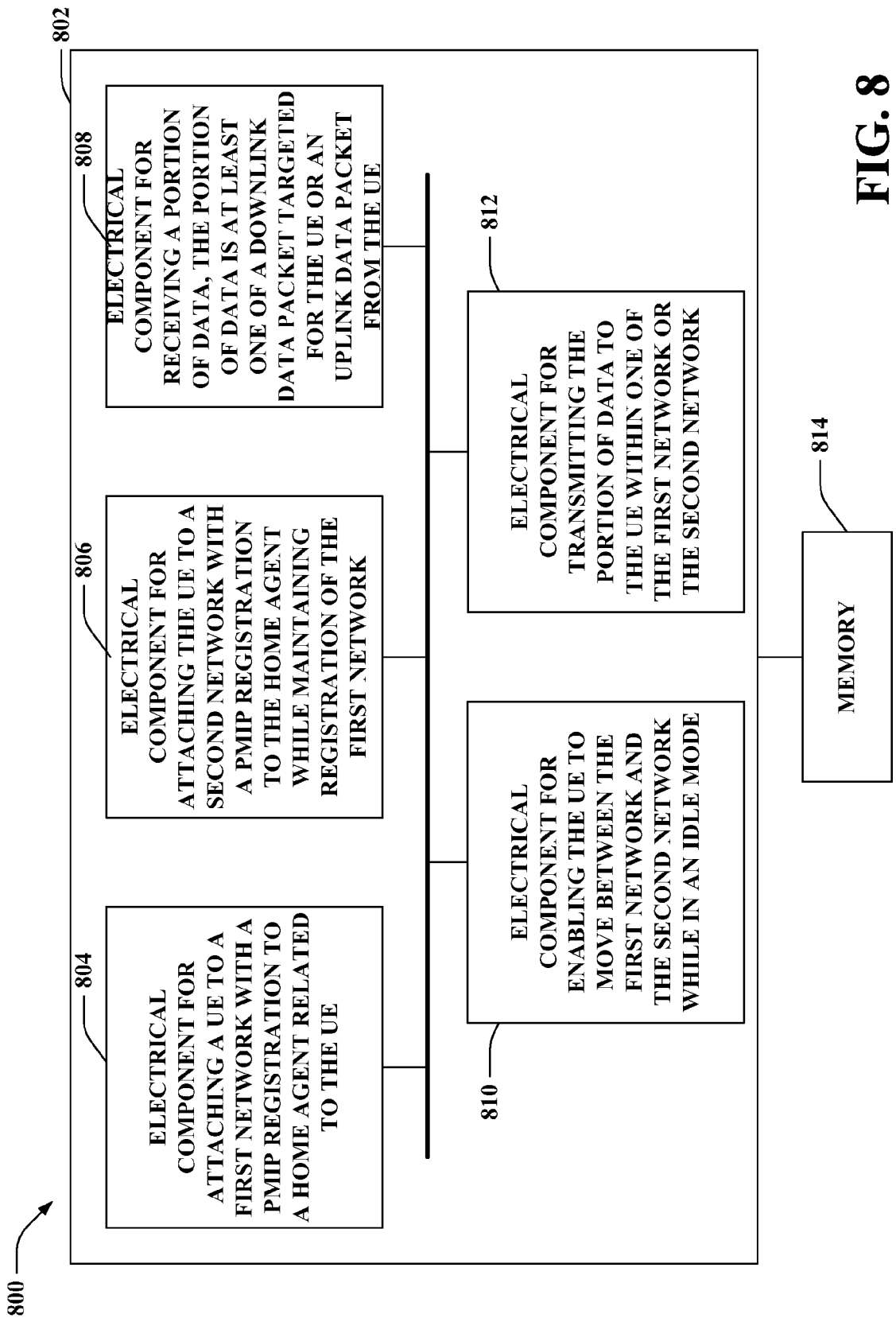
FIG. 8 is an illustration of an example system that attaches and registers user equipment to two or more networks, wherein each network utilizes a particular and separate idle mode mobility technique.

With reference to FIG. 8, illustrated is a system 800 that attaches and registers user equipment to two or more networks, wherein each network utilizes a particular and separate idle mode mobility technique. For example, system 800 can reside at least partially within a base station, mobile device, home agent, network, etc. It is to be appreciated that system 800 is represented as including functional blocks, which can be functional blocks that represent functions implemented by a processor, software, or combination thereof (e.g., firmware). System 800 includes a logical grouping 802 of electrical components that facilitate enabling multiple address access between two or more networks. The logical grouping 802 can include an electrical component for attaching a user equipment (UE) to a first network with a proxy mobile Internet Protocol (PMIP) registration to a home agent related to the UE 804. In addition, the logical grouping 802 can comprise an electrical component for attaching the UE to a second network with a PMIP registration to the home agent while maintaining registration of the first network 806. Moreover, the logical grouping 802 can include an electrical component for receiving a portion of data, the portion of data is at least one of a downlink data packet targeted for the UE or an uplink data packet from the UE 808. The logical grouping 802 can include an electrical component for enabling the UE to move between the first network and the second network while in an idle mode, wherein the idle mode is a mode in which no signaling is generated. Moreover, the logical grouping 802 can include an electrical component for transmitting the portion of data to the UE within one of the first network or the second network, wherein the network to which the UE resides is identified by at least one of an active mode indication received from the UE or a page response received from the UE. Additionally, system 800 can include a memory 814 that retains instructions for executing functions associated with electrical components 804, 806, 808, 810, and 812. While shown as being external to memory 814, it is to be understood that one or more of electrical components 804, 806, 808, 810, and 812 can exist within memory 814.

Figure 9:
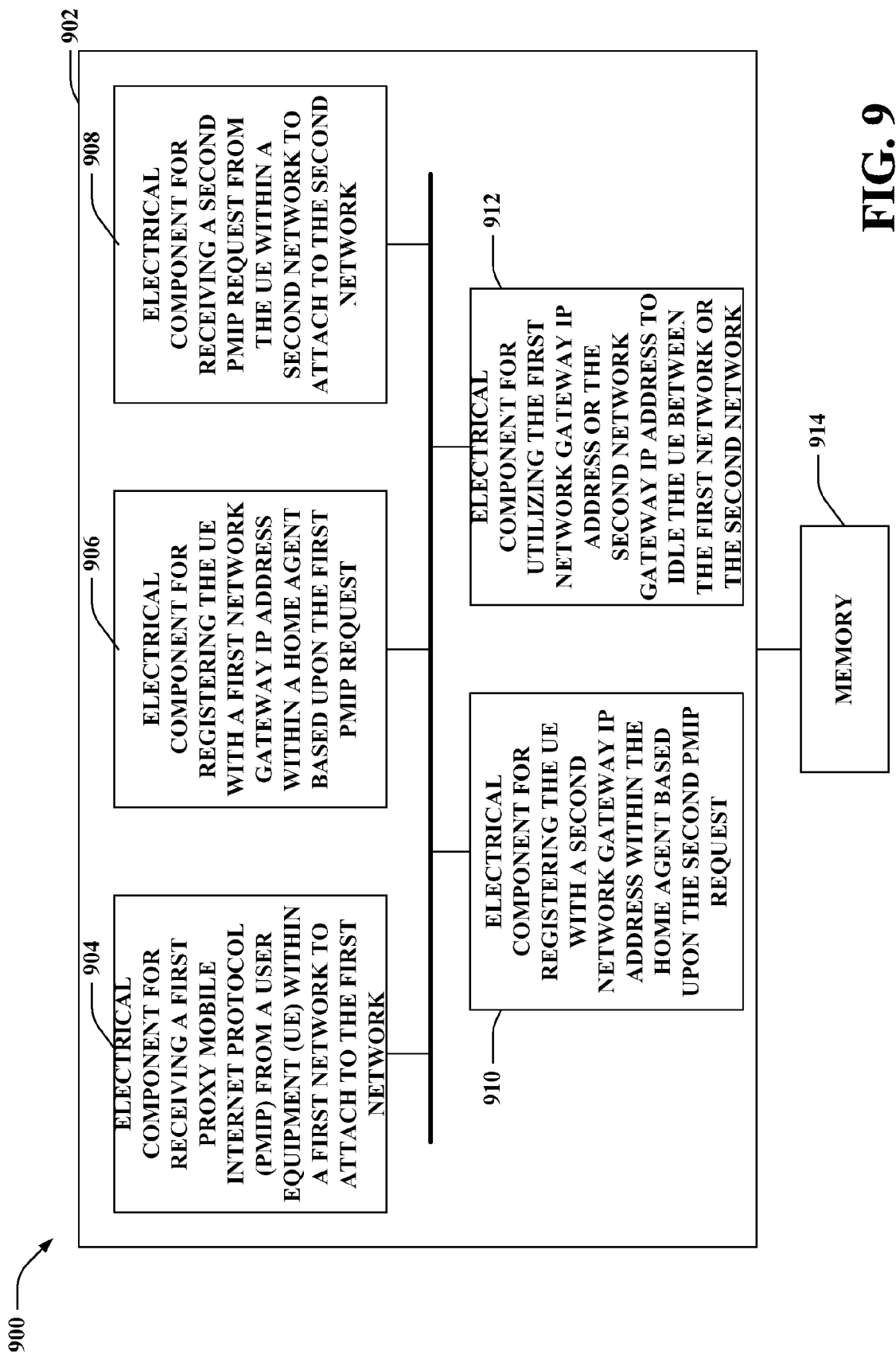
FIG. 9 is an illustration of an example system that registers user equipment with multiple addresses within a home agent to enable seamless and efficient idle mode mobility between multiple networks.

Turning to FIG. 9, illustrated is a system 900 that registers user equipment with multiple addresses within a home agent to enable seamless and efficient idle mode mobility between multiple networks. System 900 can reside within a base station, mobile device, home agent, network, etc., for instance. As depicted, system 900 includes functional blocks that can represent functions implemented by a processor, software, or combination thereof (e.g., firmware). System 900 includes a logical grouping 902 of electrical components that facilitate providing idle mode mobility across two or more networks. Logical grouping 902 can include an electrical component for receiving a first proxy mobile Internet Protocol (PMIP) request from a user equipment (UE) within a first network to attach to the first network 904. Moreover, logical grouping 902 can include an electrical component for registering the UE with a first network gateway IP address within a home agent based upon the first PMIP request 906. Further, logical grouping 902 can comprise an electrical component for receiving a second PMIP request from the UE within a second network to attach to the second network 908. In addition, logical grouping 902 can include an electrical component for registering the UE with a second network gateway IP address within the home agent based upon the second PMIP request 910. Further, logical grouping 902 can comprise an electrical component for utilizing at least one of the first network gateway IP address or the second network gateway IP address to allow the UE to execute an idle mode between the first network and the second network without performing at least one of a re-registration of the UE during such idle mode or a de-registration of the UE during such idle mode 912. Additionally, system 900 can include a memory 914 that retains instructions for executing functions associated with electrical components 904, 906, 908, 910, and 912. While shown as being external to memory 914, it is to be understood that electrical components 904, 906, 908, 910, and 912 can exist within memory 914.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates enabling multiple address access between two or more networks, comprising:
    attaching a user equipment (UE) to a first network with a proxy mobile Internet Protocol (PMIP) registration to a home agent related to the UE;
    attaching the UE to a second network with a PMIP registration to the home agent while maintaining registration of the first network, wherein the home agent is configured to communicate with both the first network and the second network;
    determining whether the PMIP registration with the home agent has expired;
    enabling the UE to move between the first network and the second network in an idle mode if the PMIP registration has not expired, wherein the idle mode is a mode in which no signaling is generated;
    receiving a portion of data, the portion of data is at least one of a downlink data packet targeted for the UE or an uplink data packet from the UE; and
    transmitting the portion of data to the UE within one of the first network or the second network, the network to which the UE resides is identified by at least one of an active mode indication received from the UE or a page response received from the UE.

2. The method of claim 1, further comprising the following if the portion of data is the downlink data packet:
    paging the UE in the first network and the second network;
    receiving the page response from the UE from within one of the first network or the second network; and
    transmitting the downlink data packet to the UE within the network to which the page response is received.

3. The method of claim 1, further comprising the following if the portion of data is the uplink data packet:
    receiving the active mode indication from the UE from within one of the first network or the second network; and
    communicating with the UE within the network to which the active mode indication is received.

4. The method of claim 1, wherein the first network is a 3G network and the second network is a CDMA2000 network.

5. The method of claim 1, wherein the first network and the second network is a combination of a 3G network, a CDMA2000 network, and a UMTS network.

6. The method of claim 1, further comprising universally tracking the UE in an idle mode within at least one of the first network or the second network without additional signaling based upon the attachment of the UE to the first network and the second network and the registration with the home agent.

7. The method of claim 1, further comprising sending a proxy binding update (PBU) to the home agent based upon the receipt of at least one of the active mode indication or the page response.

8. The method of claim 7, wherein the PBU deletes the PMIP registration for the network that the UE does not reside.

9. The method of claim 8, further comprising sending a PBU to the home agent based upon receipt of an idle mode indication from the UE.

10. The method of claim 9, wherein the PBU adds the PMIP registration for the network that the UE does not reside.

11. The method of claim 1, wherein the first network and the second network are at least one of a 3GPP access network or a non-3GPP access network.

12. The method of claim 11, wherein a PMIP protocol is operated between a gateway and the home agent.

13. The method of claim 12, wherein a PMIP home agent is included in a 3GPP packet data network gateway (PDN GW).

14. The method of claim 13, wherein the gateway is at least one of a 3GPP serving gateway, a non-3GPP gateway, or an evolved packet data gateway (ePDG).

15. A wireless communications apparatus, comprising:
    at least one processor configured to:
        attach a user equipment (UE) to a first network with a proxy mobile Internet Protocol (PMIP) registration to a home agent related to the UE;
        attach the UE to a second network with a PMIP registration to the home agent while maintaining registration of the first network, wherein the home agent is configured to communicate with both the first network and the second network;
        receive a portion of data, the portion of data is at least one of a downlink data packet targeted for the UE or an uplink data packet from the UE;
        determine whether the PMIP registration with the home agent has expired;
        enable the UE to move between the first network and the second network while in an idle mode if the PMIP registration has not expired, wherein the idle mode is a mode in which no signaling is generated; and
        transmit the portion of data to the UE within one of the first network or the second network, the network to which the UE resides is identified by at least one of an active mode indication received from the UE or a page response received from the UE; and
    a memory coupled to the at least one processor.

16. The wireless communications apparatus of claim 15, the at least one processor is configured to provide the following if the portion of data is the downlink data packet:
    page the UE in the first network and the second network;
    receive the page response from the UE from within one of the first network or the second network; and
    transmit the downlink data packet to the UE within the network to which the page response is received.

17. The wireless communications apparatus of claim 15, the at least one processor is configured to provide the following if the portion of data is the uplink data packet:
    receive the active mode indication from the UE from within one of the first network or the second network; and
    communicate with the UE within the network to which the active mode indication is received.

18. The wireless communications apparatus of claim 15, wherein the first network is a 3G network and the second network is a CDMA2000 network.

19. The wireless communications apparatus of claim 15, wherein the first network and the second network is a combination of a 3G network, a CDMA2000 network, and a UMTS network.

20. The wireless communications apparatus of claim 15, the at least one processor is configured to universally track the UE in an idle mode within at least one of the first network or the second network without additional signaling based upon the attachment of the UE to the first network and the second network and the registration with the home agent.

21. The wireless communications apparatus of claim 15, the at least one processor is configured to send a proxy binding update (PBU) to the home agent based upon the receipt of at least one of the active mode indication or the page response.

22. The wireless communications apparatus of claim 21, wherein the PBU deletes the PMIP registration for the network that the UE does not reside.

23. The wireless communications apparatus of claim 22, the at least one processor is configured to send a PBU to the home agent based upon receipt of an idle mode indication from the UE.

24. The wireless communications apparatus of claim 23, wherein the PBU adds the PMIP registration for the network that the UE does not reside.

25. The wireless communications apparatus of claim 15, wherein the first network and the second network are at least one of a 3GPP access network or a non-3GPP access network.

26. The wireless communications apparatus of claim 25, wherein a PMIP protocol is operated between a gateway and the home agent.

27. The wireless communications apparatus of claim 26, wherein a PMIP home agent is included in a 3GPP packet data network gateway (PDN GW).

28. The wireless communications apparatus of claim 27, wherein the gateway is at least one of a 3GPP serving gateway, a non-3GPP gateway, or an evolved packet data gateway (ePDG).

29. A computer program product, comprising:
a non-transitory computer-readable medium comprising:
code for causing at least one computer to attach a user equipment (UE) to a first network with a proxy mobile Internet Protocol (PMIP) registration to a home agent related to the UE;
code for causing the at least one computer to attach the UE to a second network with a PMIP registration to the home agent while maintaining registration of the first network, wherein the home agent is configured to communicate with both the first network and the second network;
code for causing the at least one computer to determine whether the PMIP registration with the home agent has expired;
code for causing the at least one computer to enable the UE to move between the first network and the second network in an idle mode if the PMIP registration has not expired, wherein the idle mode is a mode in which no signaling is generated;
code for causing the at least one computer to receive a portion of data, the portion of data is at least one of a downlink data packet targeted for the UE or an uplink data packet from the UE; and
code for causing the at least one computer to transmit the portion of data to the UE within one of the first network or the second network, wherein the network to which the UE resides is identified by at least one of an active mode indication received from the UE or a page response received from the UE.

30. The computer program product of claim 29, wherein the non-transitory computer-readable_medium further comprising the following if the portion of data is the downlink data packet:
code for causing the at least one computer to page the UE in the first network and the second network;
code for causing the at least one computer to receive the page response from the UE from within one of the first network or the second network; and
code for causing the at least one computer to transmit the downlink data packet to the UE within the network to which the page response is received.

31. The computer program product of claim 29, wherein the non-transitory computer-readable_medium further comprising the following if the portion of data is the uplink data packet:
code for causing the at least one computer to receive the active mode indication from the UE from within one of the first network or the second network; and
code for causing the at least one computer to communicate with the UE within the network to which the active mode indication is received.

32. The computer program product of claim 29, wherein the first network is a 3G network and the second network is a CDMA2000 network.

33. The computer program product of claim 29, wherein the first network and the second network is a combination of a 3G network, a CDMA2000 network, and a UMTS network.

34. The computer program product of claim 29, wherein the non-transitory computer-readable_medium further comprising code for causing the at least one computer to universally track the UE in an idle mode within at least one of the first network or the second network without additional signaling based upon the attachment of the UE to the first network and the second network and the registration with the home agent.

35. The computer program product of claim 29, wherein the non-transitory computer-readable_medium further comprising code for causing the at least one computer to send a proxy binding update (PBU) to the home agent based upon the receipt of at least one of the active mode indication or the page response.

36. The computer program product of claim 35, wherein the PBU deletes the PMIP registration for the network that the UE does not reside.

37. The computer program product of claim 36, wherein the non-transitory computer-readable_medium further comprising code for causing the at least one computer to send a PBU to the home agent based upon receipt of an idle mode indication from the UE.

38. The computer program product of claim 37, wherein the PBU adds the PMIP registration for the network that the UE does not reside.

39. The computer program product of claim 29, wherein the first network and the second network are at least one of a 3GPP access network or a non-3GPP access network.

40. The computer program product of claim 39, wherein a PMIP protocol is operated between a gateway and the home agent.

41. The computer program product of claim 40, wherein a PMIP home agent is included in a 3GPP packet data network gateway (PDN GW).

42. The computer program product of claim 41, wherein the gateway is at least one of a 3GPP serving gateway, a non-3GPP gateway, or an evolved packet data gateway (ePDG).

43. A method that facilitates idle mode mobility across two or more networks, comprising:
- receiving a first proxy mobile Internet Protocol (PMIP) request from a user equipment (UE) within a first network to attach to the first network;
- registering the UE with a first network gateway IP address within a home agent based upon the first PMIP request;
- receiving a second PMIP request from the UE within a second network to attach to the second network;
- registering the UE with a second network gateway IP address within the home agent based upon the second PMIP request, wherein the home agent is configured to communicate with both the first network and the second network;
- determining whether the registration for the first or second network gateway IP addresses with the home agent has expired; and
- utilizing at least one of the first network gateway IP address or the second network gateway IP address to allow the UE to execute an idle mode between the first network and the second network without performing at least one of a re-registration of the UE during such idle mode or a de-registration of the UE during such idle mode if the registration with the first or second network gateway IP addresses has not expired.

44. The method of claim 43, further comprising communicating a portion of data to a first network gateway within the first network and to a second network gateway within the second network, the portion of data is communicated upon receipt of a downlink packet targeted for the UE.

45. The method of claim 44, further comprising storing the first network gateway IP address and the second gateway IP address in a binding cache in the home agent.

46. The method of claim 45, further comprising receiving a proxy binding update (PBU) with a source address, the PBU provides one of the following:
- a deletion of the first network gateway IP address within the home agent if the source address of the PBU is from the second network gateway IP address; or
- a deletion of the second network gateway IP address within the home agent if the source address of the PBU is from the first network gateway IP address.

47. The method of claim 46, wherein the PBU includes a wild-card delete instruction that removes the network gateway IP addresses in the binding cache of the home agent except a source address of the PBU.

48. The method of claim 47, further comprising communicating at least one of a portion of uplink data or a portion of downlink data between the home agent and the UE with a network gateway IP address defined by the PBU.

49. The method of claim 48, further comprising:
- receiving an idle mode indication from the UE; and
- adding at one of the following to the home agent upon receipt of the idle mode indication:
  - the first network gateway IP address within the home agent if the source address of the PBU is from the second network gateway IP address; or
  - the second network gateway IP address within the home agent if the source address of the PBU is from the first network gateway IP address.

50. The method of claim 43, wherein the first network is a 3G network and the second network is a CDMA2000 network.

51. The method of claim 43, wherein the first network and the second network is a combination of a 3G network, a CDMA2000 network, and a UMTS network.

52. The method of claim 43, wherein the first network is a UMTS network and the second network is a CDMA2000 network.

53. The method of claim 43, wherein the first network and the second network are at least one of a 3GPP access network or a non-3GPP access network.

54. The method of claim 53, wherein a PMIP protocol is operated between a gateway and the home agent.

55. The method of claim 54, wherein a PMIP home agent is included in a 3GPP packet data network gateway (PDN GW).

56. A wireless communications apparatus, comprising:
- at least one processor configured to:
  - receive a first proxy mobile Internet Protocol (PMIP) request from a user equipment (UE) within a first network to attach to the first network;
  - register the UE with a first network gateway IP address within a home agent based upon the first PMIP request;
  - receive a second PMIP request from the UE within a second network to attach to the second network;
  - register the UE with a second network gateway IP address within the home agent based upon the second PMIP request, wherein the home agent is configured to communicate with both the first network and the second network;
  - determine whether the registration for the first or second network gateway IP addresses with the home agent has expired; and
  - utilize at least one of the first network gateway IP address or the second network gateway IP address to allow the UE to execute an idle mode between the first network and the second network without performing at least one of a re-registration of the UE during such idle mode or a de-registration of the UE during such idle mode if the registration with the first or second network gateway IP addresses has not expired; and
- a memory coupled to the at least one processor.

57. The wireless communications apparatus of claim 56, further comprising at least one processor configured to communicate a portion of data to a first network gateway within the first network and to a second network gateway within the second network, the portion of data is communicated upon receipt of a downlink packet targeted for the UE.

58. The wireless communications apparatus of claim 57, further comprising at least one processor configured to store the first network gateway IP address and the second gateway IP address in a binding cache in the home agent.

59. The wireless communications apparatus of claim 58, further comprising at least one processor configured to receive a proxy binding update (PBU) with a source address, the PBU provides one of the following:
- a deletion of the first network gateway IP address within the home agent if the source address of the PBU is from the second network gateway IP address; or
- a deletion of the second network gateway IP address within the home agent if the source address of the PBU is from the first network gateway IP address.

60. The wireless communications apparatus of claim 59, wherein the PBU includes a wild-card delete instruction that removes the network gateway IP addresses in the binding cache of the home agent except a source address of the PBU.

61. The wireless communications apparatus of claim 60, further comprising at least one processor configured to communicate at least one of a portion of uplink data or a portion of downlink data between the home agent and the UE with a network gateway IP address defined by the PBU.

62. The wireless communications apparatus of claim 61, further comprising at least one processor configured to:
- receive an idle mode indication from the UE; and
- add at one of the following to the home agent upon receipt of the idle mode indication:
  - the first network gateway IP address within the home agent if the source address of the PBU is from the second network gateway IP address; or
  - the second network gateway IP address within the home agent if the source address of the PBU is from the first network gateway IP address.

63. The wireless communications apparatus of claim 56, wherein the first network is a 3G network and the second network is a CDMA2000 network.

64. The wireless communications apparatus of claim 56, wherein the first network and the second network is a combination of a 3G network, a CDMA2000 network, and a UMTS network.

65. The wireless communications apparatus of claim 56, wherein the first network is a UMTS network and the second network is a CDMA2000 network.

66. The wireless communications apparatus of claim 56, wherein the first network and the second network are at least one of a 3GPP access network or a non-3GPP access network.

67. The wireless communications apparatus of claim 66, wherein a PMIP protocol is operated between a gateway and the home agent.

68. The wireless communications apparatus of claim 67, wherein a PMIP home agent is included in a 3GPP packet data network gateway (PDN GW).

69. The wireless communications apparatus of claim 68, wherein the gateway is at least one of a 3GPP serving gateway, a non-3GPP gateway, or an evolved packet data gateway (ePDG).

70. A computer program product, comprising:
a non-transitory computer-readable medium comprising:
- code for causing at least one computer to receive a first proxy mobile Internet Protocol (PMIP) request from a user equipment (UE) within a first network to attach to the first network;
- code for causing the at least one computer to register the UE with a first network gateway IP address within a home agent based upon the first PMIP request;
- code for causing the at least one computer to receive a second PMIP request from the UE within a second network to attach to the second network;
- code for causing the at least one computer to register the UE with a second network gateway IP address within the home agent based upon the second PMIP request, wherein the home agent is configured to communicate with both the first network and the second network;
- code for causing the at least one computer to determine whether the registration for the first or second network gateway IP addresses with the home agent has expired; and
- code for causing the at least one computer to utilize at least one of the first network gateway IP address or the second network gateway IP address to allow the UE to execute an idle mode between the first network and the second network without performing at least one of a re-registration of the UE during such idle mode or a de-registration of the UE during such idle mode if the registration with the first or second network gateway IP addresses has not expired.

71. The computer program product of claim 70, wherein the non-transitory computer-readable_medium further comprising code for causing the at least one computer to communicate a portion of data to a first network gateway within the first network and to a second network gateway within the second network, the portion of data is communicated upon receipt of a downlink packet targeted for the UE.

72. The computer program product of claim 71, wherein the non-transitory computer-readable medium further comprising code for causing the at least one computer to store the first network gateway IP address and the second gateway IP address in a binding cache in the home agent.

73. The computer program product of claim 72, wherein the non-transitory computer-readable_medium further comprising code for causing the at least one computer to receive a proxy binding update (PBU) with a source address, the PBU provides one of the following:
- a deletion of the first network gateway IP address within the home agent if the source address of the PBU is from the second network gateway IP address; or
- a deletion of the second network gateway IP address within the home agent if the source address of the PBU is from the first network gateway IP address.

74. The computer program product of claim 73, wherein the PBU includes a wild-card delete instruction that removes the network gateway IP addresses in the binding cache of the home agent except a source address of the PBU.

75. The computer program product of claim 74, wherein the non-transitory computer-readable medium further comprising code for causing the at least one computer to communicate at least one of a portion of uplink data or a portion of downlink data between the home agent and the UE with a network gateway IP address defined by the PBU.

76. The computer program product of claim 70, wherein the non-transitory computer-readable medium further comprising:
- code for causing the at least one computer to receive an idle mode indication from the UE; and
- code for causing the at least one computer to add at one of the following to the home agent upon receipt of the idle mode indication:
  - the first network gateway IP address within the home agent if the source address of the PBU is from the second network gateway IP address; or
  - the second network gateway IP address within the home agent if the source address of the PBU is from the first network gateway IP address.

77. The computer program product of claim 70, wherein the first network is a 3G network and the second network is a CDMA2000 network.

78. The computer program product of claim 70, wherein the first network and the second network is a combination of a 3G network, a CDMA2000 network, and a UMTS network.

79. The computer program product of claim 70, wherein the first network is a UMTS network and the second network is a CDMA2000 network.

80. The computer program product of claim 70, wherein the first network and the second network are at least one of a 3GPP access network or a non-3GPP access network.

81. The computer program product of claim 80, wherein a PMIP protocol is operated between a gateway and the home agent.

82. The computer program product of claim 81, wherein a PMIP home agent is included in a 3GPP packet data network gateway (PDN GW).

83. The computer program product of claim 82, wherein the gateway is at least one of a 3GPP serving gateway, a non-3GPP gateway, or an evolved packet data gateway (ePDG).

84. The method of claim 55, wherein the gateway is at least one of a 3GPP serving gateway, a non-3GPP gateway, or an evolved packet data gateway (ePDG).

* * * * *